United States Patent
Lindell et al.

(10) Patent No.: US 8,357,226 B2
(45) Date of Patent: Jan. 22, 2013

(54) METHOD FOR SEPARATING ZINC, IRON, CALCIUM, COPPER AND MANGANESE FROM THE AQUEOUS SOLUTIONS OF COBALT AND/OR NICKEL

(75) Inventors: Esa Lindell, Pori (FI); Rauno Luoma, Pori (FI); Arja Oja, Ulvila (FI)

(73) Assignee: Norilsk Nickel Finland OY, Espoo (FI)

( * ) Notice: Subject to any disclaimer, the term of this patent is extended or adjusted under 35 U.S.C. 154(b) by 80 days.

(21) Appl. No.: 12/918,119

(22) PCT Filed: Feb. 18, 2009

(86) PCT No.: PCT/FI2009/050134
§ 371 (c)(1), (2), (4) Date: Dec. 6, 2010

(87) PCT Pub. No.: WO2009/103850
PCT Pub. Date: Aug. 27, 2009

(65) Prior Publication Data
US 2011/0072937 A1    Mar. 31, 2011

(30) Foreign Application Priority Data
Feb. 19, 2008    (FI) ..................... 20080138

(51) Int. Cl.
C22B 3/26    (2006.01)
C22B 3/42    (2006.01)

(52) U.S. Cl. ............................ 75/723; 423/139; 210/634
(58) Field of Classification Search .................... 75/711; 423/139; 210/634
See application file for complete search history.

(56) References Cited

U.S. PATENT DOCUMENTS

| | | | |
|---|---|---|---|
| 3,761,249 A * | 9/1973 | Ritcey et al. | 423/24 |
| 4,067,802 A | 1/1978 | Cronberg et al. | |
| 4,353,883 A * | 10/1982 | Rickelton et al. | 423/139 |
| 4,900,522 A * | 2/1990 | Chou et al. | 423/139 |
| 4,956,154 A | 9/1990 | Magdics et al. | |
| 7,736,606 B2 * | 6/2010 | Harris et al. | 423/22 |
| 7,935,322 B2 * | 5/2011 | Cheng et al. | 423/139 |
| 2003/0064013 A1 | 4/2003 | O'Callaghan et al. | |
| 2004/0050212 A1 * | 3/2004 | Cheng et al. | 75/722 |

FOREIGN PATENT DOCUMENTS

| | | |
|---|---|---|
| AU | 667 539 | 3/1996 |
| GB | 2 324 792 | 11/1998 |
| WO | WO 2006/029439 | 3/2006 |

OTHER PUBLICATIONS

International Search Report for PCT/FI2009/050134, mailed Apr. 14, 2009.
Search Report for FI 20080138, dated Feb. 5, 2009.

* cited by examiner

*Primary Examiner* — George Wyszomierski
*Assistant Examiner* — Tima M McGuthry Banks
(74) *Attorney, Agent, or Firm* — Nixon & Vanderhye P.C.

(57) ABSTRACT

A method is provided for separating the impurities zinc, iron, calcium, copper and/or manganese from an aqueous solution that contains cobalt and nickel. The solution is brought into a mixing contact with an extraction solution, which is pre-loaded with cobalt and nickel ions, whereby the cobalt and nickel in the extraction solution are replaced with the impurity metals, and the aqueous solution is cleaned from impurities after this phase. This purified aqueous solution, raffinate, can be used to pre-charge the extraction solution so that a minor part of the raffinate is contacted with a pre-neutralized extraction solution, whereby the cobalt and nickel replace the alkali metal, alkali earth metal or ammonium ion that is used in the pre-neutralization.

14 Claims, 2 Drawing Sheets

METHOD FOR SEPARATING ZINC, IRON, CALCIUM, COPPER AND MANGANESE FROM THE AQUEOUS SOLUTIONS OF COBALT AND/OR NICKEL

This application is the U.S. national phase of International Application No. PCT/FI2009/050134 filed 18 Feb. 2009 which designated the U.S. and claims priority to FI 20080138 filed 19 Feb. 2008, the entire contents of each of which are hereby incorporated by reference.

The invention relates to a method for separating zinc, iron, calcium, copper and manganese by liquid-liquid extraction from aqueous solutions containing cobalt and/or nickel.

Zinc, iron, calcium, manganese and copper enter hydrometallurgical processes within raw materials. Regarding the quality of the end product and the process, it is important to remove these impurities. The contents of impurities vary depending on the pre-treatment method of the raw material used.

For the separation of impurities from the aqueous solutions containing cobalt and/or nickel, there are generally several processing alternatives, one of which is described herein. In the solutions based on the liquid-liquid extraction used, the alkali metal, alkali earth metal and/or ammonium ions that are used as neutralizers end up in a raffinate.

In the liquid-liquid extraction processes that are based on the cation exchange extraction mechanism, metals transfer from the aqueous solutions to a water insoluble organic extraction solution according to the following chemical equation (1) (the upper line describes the organic solution):

$$Me^{2+} + 2\overline{HA} \Leftrightarrow \overline{MeA_2} + 2H^+ \quad (1)$$

According to the reaction equation (1), the equilibrium contents of the fractions of the extraction reaction are mainly determined by the pH of the aqueous solution. To bring the desired equilibrium to the side of the reaction products, the hydrogen ions released in the aqueous solution must be neutralized. Generally, the neutralizers used either comprise ammonia or alkali hydroxides. The cations of the neutralizers may cause problems with precipitate or contaminations at the further stages of the process. To prevent this, an extraction process similar to the patent AU667539B has been presented, among others. According to the patent, the noble metals cobalt and nickel are separated from each other by means of transmitter ions so that, in a pre-extraction, a pre-neutralized extraction solution is brought into contact with an aqueous solution containing transmitter ions. In the extraction solution, these transmitter ions replace the ammonium or alkali metal ions, which move to the aqueous solution that is conveyed out of the process. The extraction solution, now containing the transmitter ions, is contacted with the aqueous solution containing noble metals. In the extraction solution, the noble metals, in turn, replace the transmitter ions, which end up in the aqueous solution. The aqueous solution containing the transmitter ions returns to the pre-extraction, whereby the transmitter ion is not essentially consumed in the process. If required, transmitter ions can be added to replace any losses. In the extraction process similar to this patent, the transmitter ion ends up in the extraction raffinate.

According to certain embodiments of this invention, a method has now been provided whereby impurity metals zinc, iron, copper, calcium and/or manganese contained in an aqueous feed solution which also contains product metals cobalt and nickel are separated from such product metals by liquid-liquid extraction with an extraction solution that has been pre-charged with cobalt and nickel. The impurity metals are thus separated from the feed solution into the extraction solution so as to obtain a raffinate containing the product metals.

The advantages of the improved method, compared with the process described above, include a more straight forward process without transmitter ions and circulation thereof, whereby the transmitter ions neither end up in the raffinate nor contaminate the products, and an opportunity to improve the total effectiveness of the extraction process by exploiting chloride-containing wash waters.

DETAILED DESCRIPTION

Figure 1:
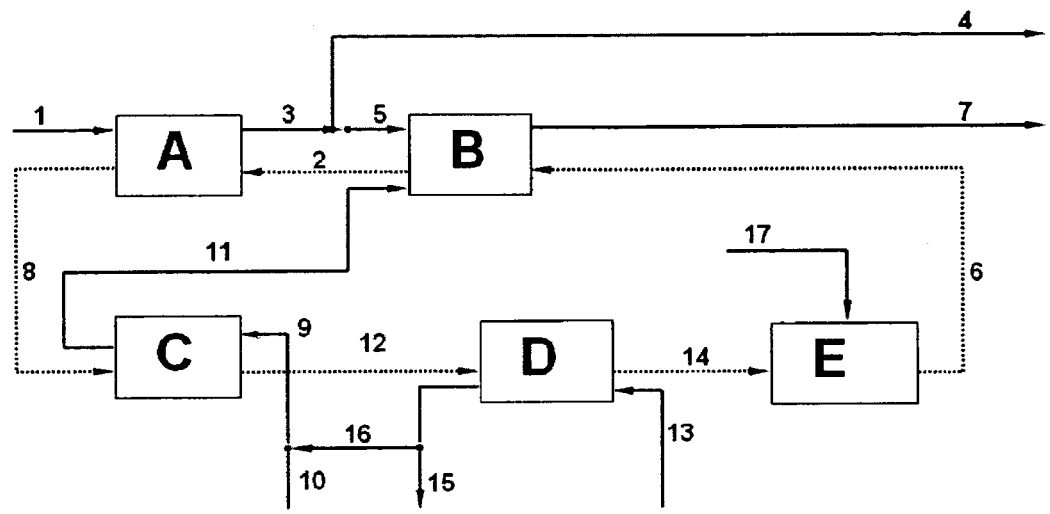
FIG. 1 is a flowsheet of an extraction method in accordance with an embodiment of the invention.

The invention relates to a method for separating the impurities zinc, iron, calcium, copper and/or manganese from aqueous solutions containing cobalt and/or nickel. The aqueous solution containing metallic salts is brought into a mixing contact with the extraction solution, which is pre-charged with cobalt and/or nickel ions, whereby the cobalt and/or nickel in the extraction solution are replaced with impurity metals and the aqueous solution, now called raffinate, is cleaned from impurities after this stage. Part of the raffinate can be used to pre-charge the extraction solution with cobalt and/or nickel ions by bringing it into contact with the pre-neutralized extraction solution. The cobalt and/or nickel ions replace the alkali metal, alkali earth metal and/or ammonium ions that are used in the pre-neutralization. The process coupling preferably prevents the alkali metal, alkali earth metal and/or ammonium ions that are used in the neutralization of the extraction from ending up in the extraction raffinate. After this pre-charging stage, the aqueous solution that contains the said alkali metal, alkali earth metal and/or ammonium ion, but no cobalt and/or nickel, is conveyed out of the process as reject.

Pre-charging means extracting the product metal in the extraction solution. Generally, the pre-charging is carried out by a cation exchange extraction reagent at a higher pH before the actual extraction stage of the impurity metals at a lower pH. At the actual extraction stage, an ion-exchange takes place between the said product metal in the extraction solution and the impurity metal in the aqueous solution, the impurity metal transferring to the extraction solution and the product metal transferring to the aqueous solution. The ion exchange is based on a selectivity of the impurity metal of the extraction reagent higher than that of the product metal at the same pH of the aqueous solution.

In sulphate-based processes, cation exchange extraction reagents are typically used. Such commercially significant extraction reagents include acidic phosphorus-containing extraction reagents, carboxylic acid-based extraction reagents and hydroxy oxime-based extraction reagents.

After the extraction stage, the extraction solution can be washed at a separate washing stage to remove the cobalt and/or nickel ions remaining in the extraction solution. This coupling enables the use of impurity metal chlorides to enhance washing. The cobalt and/or nickel ions remaining in the extraction solution are replaced with impurity ions and they move to the chloride-containing aqueous solution. The washing water is conveyed to the above-mentioned pre-charging stage, whereby the chloride ions that come along escape to the reject and the cobalt and/or nickel is recovered into the extraction solution.

After the washing stage, the impurities are back-extracted into the aqueous solution preferably by hydrochloric acid.

The advantages of this method compared with previous processes comprise: the alkali metal, alkali earth metal and/or ammonium ions used in the neutralization do not end up in the extraction raffinate, a more straight forward process without transmitter ions and their circulation, whereby the transmitter ions neither end up in the raffinate nor contaminate the products, and the opportunity to improve the total effectiveness of the extraction process by utilizing chloride-containing washing waters.

The feed solution is an aqueous solution that contains cobalt and/or nickel as bivalent ions, the counter-ion preferably being a sulphate ion. The cobalt content of the feed solution can be, e.g., 0-5 g/L and its nickel content, e.g., 50-130 g/L. Furthermore, the solution can contain as impurities, e.g., 0-1 g/L of iron, e.g., 0-10 g/L of zinc, e.g., 0-0.6 g/L of calcium, e.g., 0-10 g/L of copper and, e.g., 0-10 g/L of manganese. These concentrations and impurities are suggestive and do not limit the applicability of the invention.

The extraction reagent, which is used in the water insoluble extraction solution, is preferably a cation exchange extraction reagent, such as di-2-ethylhexyl phosphoric acid with the trade name of, e.g., DEHPA (the manufacturer being Rhodia). The extraction reagent is diluted in kerosene or another suitable organic inert solvent that is poorly-soluble in water.

The process coupling of the method is, for example, the selective liquid-liquid extraction method according to FIG. 1. A feed solution (1) containing impurities is conveyed to the extraction stage (A), wherein the impurity metals are extracted into the pre-charged extraction solution (2). The pre-charged extraction solution contains cobalt and/or nickel. In the ion exchange reaction of the extraction stage, the impurity metal ions of the aqueous solution form a metal complex with the extraction reagent, while the cobalt and/or nickel ions are released from the extraction reagent into the aqueous solution. This aqueous solution is now called a raffinate (3).

A prerequisite of a successful extraction reaction is a pH favorable for the extraction of impurity metals. According to laboratory tests, a preferable pH is 2-3.5, whereby the best possible separation is obtained between the impurities and cobalt and/or nickel. After the extraction, the impurity-free raffinate is conveyed to a further process (4). Part of the raffinate is conveyed to be used as the feed solution (5) of the pre-charging stage (B). At the pre-charging stage, the cobalt and/or nickel are extracted from the aqueous solution into the pre-neutralized extraction solution (6).

In the extraction reaction of the pre-charging stage, the cobalt and/or nickel ions form a metal complex with the extraction reagent. When the metal complex forms, the alkaline salt of the extraction reagent in the pre-neutralized extraction solution delivers the alkali metal, alkali earth metal or ammonium ion to the aqueous solution, depending on the pre-neutralizer. The extraction of the pre-charging stage takes place at a pH appropriate to the cobalt and/or nickel extraction, which, according to laboratory tests, is above 4. The aqueous solution of the pre-charging stage, free of cobalt and nickel, which is called a reject (7), is removed from the process.

At the extraction stage, the extraction solution (8), charged with impurities, is conveyed to the washing stage (C), where the cobalt and/or nickel, which remained in the extraction solution at the extraction stage, is washed out. The washing water (9) used in the washing is an impurity-containing metallic chloride solution (16), to which water (10) has been added. The free hydrochloric acid contained in the metallic chloride solution enables a decrease in the pH to a level favorable for the washing of cobalt and/or nickel, but the impurity metals are not back-extracted from the extraction solution. In that case, the cobalt and/or nickel in the extraction solution are replaced with impurity metals, improving the selectivity of the method. The cobalt and/or nickel transfer to the aqueous solution, which, as the raffinate (11) of the washing stage, is conveyed to the pre-charging stage. The raffinate (11) of the washing stage can also be conveyed to the extraction stage, but if the migration of chlorides to the main solution stream (4) of the raffinate of the extraction stage and from there to the further processes is to be avoided, the coupling should be carried out according to the above. The washed extraction solution (12) is conveyed to the back-extraction stage (D).

At the back-extraction stage (D), the impurity metals contained in the extraction solution are back-extracted into the aqueous phase with the aqueous solution (13) of hydrochloric acid. The metal-free extraction solution (14) is conveyed from the back-extraction stage (D) to pre-neutralization (E). The back-extraction solution (15) containing metallic chlorides is conveyed to the further process and part of the solution (16) is used at the washing stage. In the pre-neutralization, alkali metal, alkali earth metal or ammonium hydroxides (17) can be used as the neutralizer.

Example of the Extraction Stage (A)

Figure 2:
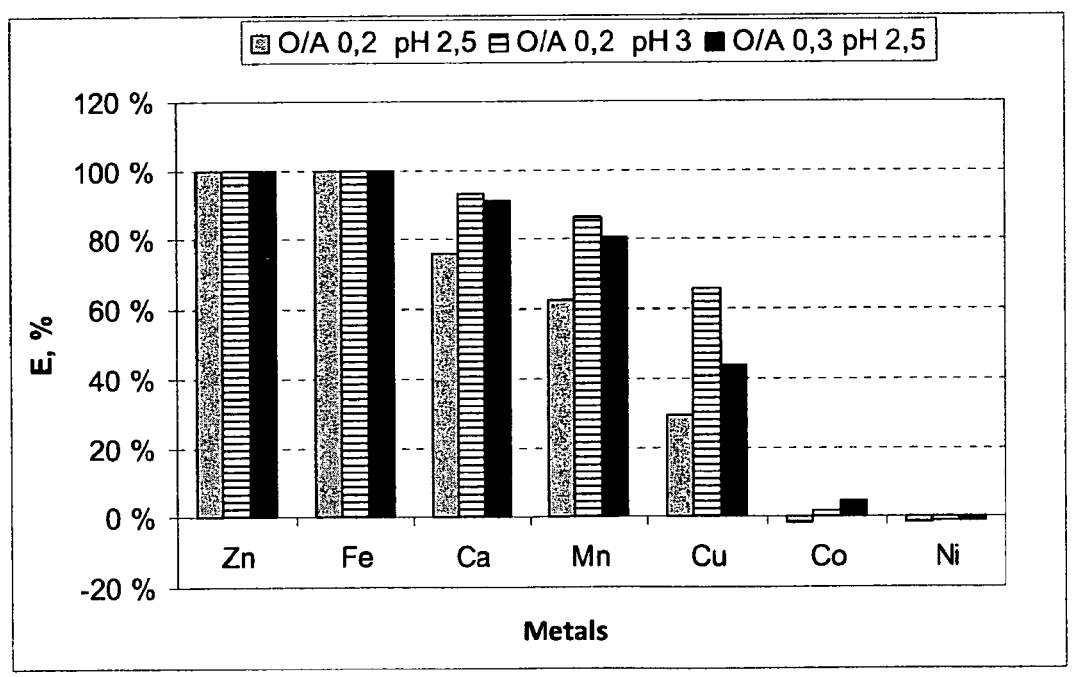
FIG. 2 is a graph showing the degrees of extraction at different equilibrium pH values.

In a laboratory, the extraction stage was examined with a pre-charged extraction solution in a thermostated 1-liter glass reactor at two different ratios of organic/water (O/A 0.2 and 0.3) and at three different pHs (2; 2.5 and 3). The temperature in the tests was 55° C., the mixing time was 20 min, the rotation speed of the mixer was 600 rpm and the diameter of the mixing member 50 mm. The aqueous solution consisted of a cobalt, nickel sulphate solution containing impurity metals. FIG. 2 shows the degree of extraction of the metals at different equilibrium pH values. A negative degree of extraction for nickel and cobalt means that some of the metal in question has transferred from the pre-charged extraction solution to the aqueous solution. For zinc and iron, almost a 100% material transfer is obtained. For the other impurity metals, the degree of extraction remains lower. As expected, the impurity metals are extracted according to the selectivity series of the reagent used: Zn>Fe>Ca>Mn>Cu>Co>Ni.

FIG. 2 shows the degrees of extraction at different equilibrium pH values. Conditions: 25 volume-% DEHPA; diluent Orfom SX-11; metal contents of the feed solution Zn 0.5 g/L; Fe 0.1 g/L; Ca 0.2 g/L; Mn 0.2 g/L; Cu 0.1 mg/L; Co 2.3 g/L and Ni 117 g/L.

Example of the Pre-Charging Stage (B)

The pre-charging stage was examined by charge tests at two stages. The extraction solution was pre-neutralized with the aqueous solution of sodium hydroxide (lye) (200 g/L) in a thermostated 1-liter glass reactor (the temperature was 50° C.). The dosage of lye was determined as a dose equivalent with respect to the metals extracted in the pre-charging. The pre-neutralized extraction solution was mixed with the metal-containing aqueous solution which, in a calculatory sense, represented the raffinate coming to the pre-charging stage (Test 1), until the equilibrium had settled. After the separation of the phases, the aqueous solution was removed from the reactor and the extraction solution, pre-charged with metals, was mixed with a corresponding aqueous solution (Test 2). In Test 3, an unused pre-neutralized extraction solution and the aqueous solution from Test 1 were mixed, whereby the aqueous solution from this test represented the reject. According to Table 1, the metals are pre-charged by almost 100%.

TABLE 1

Extraction of metals at the pre-charging stage.

|  | Zn % | Fe % | Ca % | Mn % | Cu % | Co % | Ni % |
|---|---|---|---|---|---|---|---|
| Test 1 | 100 | 100 | 98 | 100 | 100 | 97 | 95 |
| Test 2 | 100 | 100 | 88 | 98 | 100 | 83 | 56 |
| Test 3 |  |  | 86 | 98 | 93 | 100 | 98 |
| Degree of pre-charging, % | 100 | 100 | 100 | 100 | 100 | 100 | 100 |

Test 1 and Test 2 correspond to the pre-charging stage 1 and Test 3 to the pre-charging stage 2, the aqueous solution of which comprises the reject. The mixing time was 10 min and the phase ratio O/A about 12.5.

Example of the Washing Stage (C)

After the extraction stage, the washing stage of the nickel and cobalt that remained in the extraction solution was examined by first washing the extraction solution with water only, and by then adjusting the pH of the water extraction solution system to about 2.5 with the aqueous solution of sulfuric acid (about 50 g/L). The washing stage was carried out at one stage. According to FIG. 3, washing the extraction solution with water only is not effective enough, as nickel and cobalt did not escape from the extraction solution. The reason for this was the excessively high equilibrium pH. Reducing the pH considerably enhanced the washing power.

Figure 3:
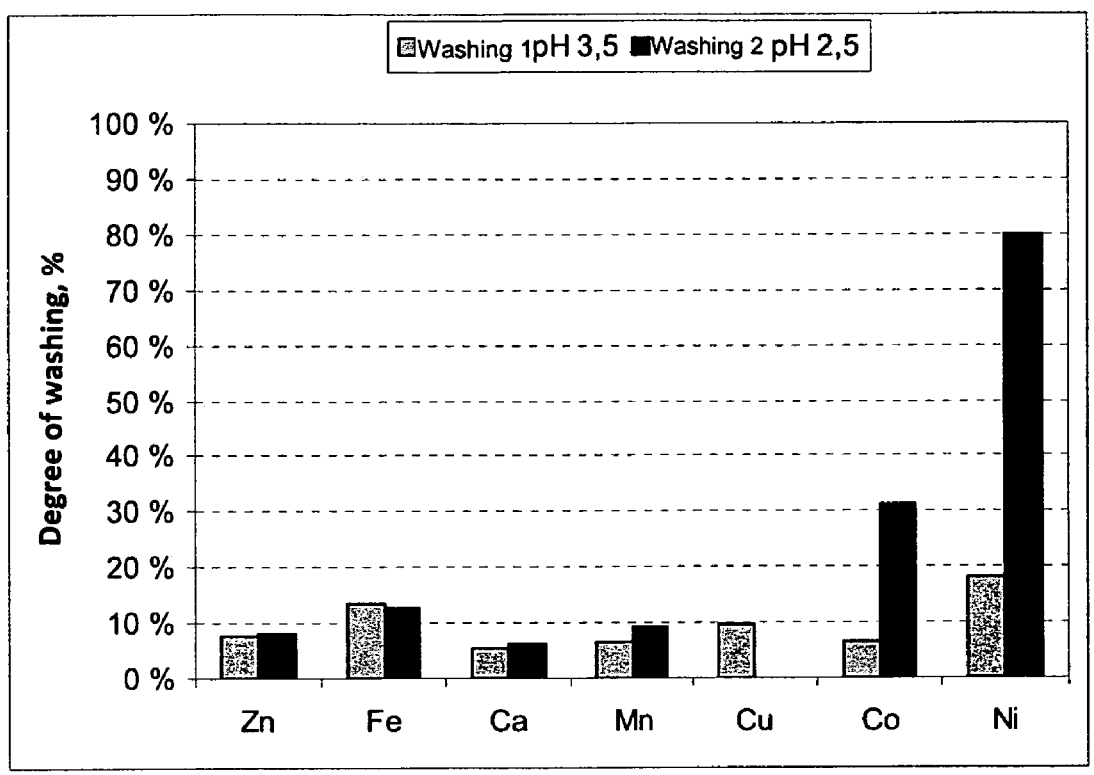
FIG. 3 is a graph showing the degree of washing of the extraction solutions.

FIG. 3 shows the washing degrees of the extraction solution, when using water in the washing (Washing 1) and when adjusting the pH to 2.5 (Washing 2). Conditions: 25 volume-% DEHPA; diluent Orfom SX-11; temperature 55° C.; O/A ratio about 8; initial contents of extraction solution Zn 5.6 g/L; Fe 1.1 g/L; Ca 1.8 g/L; Mn 0.8 g/L; Cu 2 mg/L; Co 0.4 g/L and Ni 1.6 g/L.

Example of the Back-Extraction Stage (D)

The back-extraction stage was examined with two different concentrations of the aqueous solution of hydrochloric acid (200 g/L and 250 g/L) and with three different phase ratios (O/A 10, 15, 20). The tests were carried out using a separating funnel; the shaking time was 5 min. The washed extraction solution, charged with impurity metals, was back-extracted twice by changing the aqueous solution in between. According to the results in Table 2, the metals are back-extracted from the extraction solution by almost 100%, except for iron.

TABLE 2

The degree of back-extraction for different O/A ratios and aqueous solutions of hydrochloric acid.

| O/A; HCl at the beginning | Zn % | Fe % | Ca % | Mn % | Cu % | Co % | Ni % | HCl at equilibrium g/L |
|---|---|---|---|---|---|---|---|---|
| O/A = 10; 200 g/L | 100 | 35 | 100 | 100 | 100 | 99 | 100 | 125 |
| O/A = 15; 200 g/L | 100 | 41 | 100 | 100 | 100 | 99 | 100 | 99 |
| O/A = 20; 200 g/L | 100 | 15 | 100 | 100 | 100 | 99 | 100 | 69 |
| O/A = 10; 250 g/L | 100 | 22 | 100 | 100 | 100 | 99 | 100 | 175 |
| O/A = 15; 250 g/L | 100 | 3 | 100 | 100 | 100 | 99 | 100 | 149 |
| O/A = 20; 250 g/L | 100 | 6 | 100 | 100 | 100 | 99 | 100 | 118 |

Conditions: 25 volume-% DEHPA; diluent Orfom SX-11; room temperature; initial contents of the extraction solution: Zn 3 g/L; Fe 139 mg/L; Ca 6 g/L; Mn 66 mg/L; Cu 164 mg/L; Co 53 mg/L and Ni 14 mg/L.

Continuous Laboratory Test

The extraction coupling according to FIG. 1 was examined by laboratory-scale continuous mixer-clarifier equipment. The volume of the mixer section of the equipment was 200 mL and that of the clarifier section was 1000 mL. The mixer-clarifier was provided with the internal circulation of the desired phase, whereby the internal O/A ratio was about 1. Each clarifier was provided with a heating resistor and the temperature was adjusted to about 50° C. The rotation speed of the mixing member was adjusted so as to disperse the phases.

The flow rate of the feeding solution (1) to the extraction stage (A) was about 3 L/h and that of the extraction solution circulating in the coupling was about 3 L/h. The flow rate of the feeding solution (5) of the pre-charging stage (B) was 0.1 L/h. The flow rate of the washing water (9) to the washing stage (C) was about 0.5 L/h and that of the aqueous solution (13) of hydrochloric acid to the back-extraction stage (D) was about 0.3 L/h.

Tables 3-7 show the average solution analyses of a continuous test of five days.

The results of the extraction stage (A) are shown in Table 3. According to the results, the cobalt and nickel that were pre-charged into the extraction solution are transferred to the aqueous solution at the extraction stage, and the impurity metals zinc, iron, calcium, manganese and copper are almost completely extracted.

The results of the pre-charging stage (B) are shown in Table 4. According to the results, the almost metal-free reject exits the pre-charging stage, and the extraction solution is pre-charged with cobalt and nickel.

The results of the washing stage (C) are shown in Tables 5 and 6. According to Table 5, cobalt and nickel are washed from the extraction solution and replaced with impurity metals, when the washing water contains impurity metal chlorides. According to Table 6, a sufficiently good washing degree is not achieved by using water only. In the test run, it was observed that sulphuric acid cannot be used at the washing stage, as the calcium that was washed from the extraction solution supersaturates the washing solution and, then, calcium sulphate crystallization that impedes the process activity is generated at the washing stage.

The results of the back-extraction stage (D) are shown in Table 7. According to the results, the metals are fully back-extracted with the aqueous solution of hydrochloric acid, except for iron.

TABLE 3

The average solution analyses of the extraction stage (A) of the continuous test.

| Solutions | Zn mg/L | Fe mg/L | Ca mg/L | Mn mg/L | Cu mg/L | Co mg/L | Ni mg/L |
|---|---|---|---|---|---|---|---|
| Feed solution | 862 | 225 | 454 | 2235 | 1125 | 2172 | 123676 |
| Pre-charged extraction solution | 4 | 122 | 8 | 38 | 49 | 208 | 7712 |
| Raffinate | 18 | 0.1 | 0.3 | 3 | 16 | 2187 | 128670 |
| Charged extraction solution | 1817 | 530 | 1134 | 3814 | 2057 | 219 | 1092 |
| Degree of extraction, % | 98 | 100 | 100 | 100 | 99 | −1 | −4 |

TABLE 4

The average solution analyses of the pre-charging stage (B) of the continuous test.

| Solutions | Zn mg/L | Fe mg/L | Ca mg/L | Mn mg/L | Cu mg/L | Co mg/L | Ni mg/L |
|---|---|---|---|---|---|---|---|
| Feed solution of the pre-charging stage | 18 | <0.1 | <0.1 | 3 | 16 | 2187 | 128670 |
| Raffinate of the washing stage | 15 | <0.1 | 19 | 238 | 280 | 723 | 5154 |
| Pre-neutralized extraction solution | 3 | 149 | 1 | 5 | 3 | 1 | <0.1 |
| Reject | 14 | 1 | <0.1 | 1 | 1 | 8 | 69 |
| Pre-charged extraction solution | 4 | 122 | 8 | 38 | 49 | 208 | 7712 |
| Degree of pre-charging, % | 100 | | 100 | 100 | 100 | 100 | 100 |

TABLE 5

The average solution analyses and the washing degree of the washing stage (C) of the continuous test, when the washing water used comprised a metal chloride solution containing impurity metals.

| Solutions | Zn mg/L | Fe mg/L | Ca mg/L | Mn mg/L | Cu mg/L | Co mg/L | Ni mg/L |
|---|---|---|---|---|---|---|---|
| Washing water | 303 | 44 | 151 | 721 | 328 | 26 | <0.1 |
| Charged extraction solution | 1817 | 530 | 1134 | 3814 | 2057 | 219 | 1092 |
| Raffinate of the washing stage | 15 | <0.1 | 19 | 238 | 280 | 723 | 5154 |
| Washed extraction solution | 2058 | 611 | 1257 | 4072 | 2243 | 87 | 39 |
| Washing power, % | −13 | −15 | −11 | −7 | −9 | 60 | 96 |

TABLE 6

The average solution analyses and the washing degree of the washing stage (C) of the continuous test, when the washing water used comprised pure water.

| Solutions | Zn mg/L | Fe mg/L | Ca mg/L | Mn mg/L | Cu mg/L | Co mg/L | Ni mg/L |
|---|---|---|---|---|---|---|---|
| Water (ion-exchanged) | | | | | | | |
| Charged extraction solution | 2442 | 1189 | 1179 | 4672 | 5469 | 979 | 2542 |
| Raffinate of the washing stage | <0.1 | 0.2 | 2 | 6 | 4 | 26 | 548 |
| Washed extraction solution | 2255 | 1106 | 1161 | 4287 | 5058 | 946 | 2243 |
| Washing power, % | 8 | 7 | 2 | 8 | 8 | 3 | 12 |

TABLE 7

The average solution analyses and the degree of back-extraction of the back-extraction stage (D) of the continuous test.

| Solutions | Zn mg/L | Fe mg/L | Ca mg/L | Mn mg/L | Cu mg/L | Co mg/L | Ni mg/L |
|---|---|---|---|---|---|---|---|
| Aqueous solution of the hydrochloric acid | <0.1 | <0.1 | <0.1 | <0.1 | <0.1 | <0.1 | <0.1 |
| Washed extraction solution | 2058 | 611 | 1257 | 4072 | 2243 | 87 | 39 |
| Back-extraction solution | 12993 | 971 | 6385 | 7938 | 11131 | 290 | 32 |
| Metal-free extraction solution | 7 | 384 | 5 | 23 | 20 | 1 | <0.1 |
| Degree of back-extraction, % | 100 | 37 | 100 | 99 | 99 | 99 | 100 |

The invention claimed is:

1. A method comprising:

providing an aqueous feed solution containing product metals cobalt and nickel and impurity metals zinc, iron, copper, calcium and/or manganese, providing an extraction solution containing an extraction reagent, pre-charging the extraction solution with cobalt and nickel, separating the impurity metals from the feed solution by liquid-liquid extraction between the feed and extraction solutions which causes the impurity metals to separate from the feed solution into the extraction solution to thereby obtain a raffinate containing the product metals, after extraction, washing the extraction solution in a washing stage with washing water comprising an aqueous solution containing chlorides, water or a mixture thereof, and washing the extraction solution with a back-extraction solution containing metal chlorides.

2. A method according to claim 1, wherein the washing water from the washing stage of the extraction solution is conveyed to the pre-charging stage.

3. A method according to claim 1, wherein the feed solution of the extraction is used in the pre-charging of the extraction solution.

4. A method according to claim 1, wherein, at the washing stage of the extraction solution, the product metals in the extraction solution are replaced with the impurity metals.

5. A method according to claim 1, wherein the extraction reagent is dialkyl phosphoric acid.

6. A method according to claim 5, wherein the extraction reagent is di-(2-ethyl hexyl)phosphoric acid.

7. A method according to claim 1, wherein the extraction reagent is a monoalkyl ester of alkyl phosphonic acid.

8. A method according to claim 1, wherein the extraction reagent is dialkyl phosphinic acid.

9. A method according to claim 1, wherein pH in the extraction is 2-3.5.

10. A method comprising:
providing an aqueous feed solution containing product metals cobalt and nickel and impurity metals zinc, iron, copper, calcium and/or manganese,
providing an extraction solution containing an extraction reagent,
pre-charging the extraction solution with cobalt and nickel, and
separating the impurity metals from the feed solution by liquid-liquid extraction between the feed and extraction solutions which causes the impurity metals to separate from the feed solution into the extraction solution to thereby obtain a raffinate containing the product metals,
neutralizing the extraction solution to be led to the pre-charging stage using alkali metal, alkali earth metal and/or ammonium ions, and
preventing the alkali metal, alkali earth metal and/or ammonium ions from ending up in the extraction raffinate by a process coupling in which cobalt and nickel replace the neutralizing ions at the pre-charging stage.

11. A method according to claim 10, wherein the extraction solution is neutralized at a pre-neutralizing stage.

12. A method comprising:
providing an aqueous feed solution containing product metals cobalt and nickel and impurity metals zinc, iron, copper, calcium and/or manganese,
providing an extraction solution containing an extraction reagent,
pre-charging the extraction solution with cobalt and nickel, and
separating the impurity metals from the feed solution by liquid-liquid extraction between the feed and extraction solutions which causes the impurity metals to separate from the feed solution into the extraction solution to thereby obtain a raffinate containing the product metals, and
using the extraction raffinate in the pre-charging of the extraction solution.

13. A method comprising:
providing an aqueous feed solution containing product metals cobalt and nickel and impurity metals zinc, iron, copper, calcium and/or manganese,
providing an extraction solution containing an extraction reagent,
pre-charging the extraction solution with cobalt and nickel by a cation exchange extraction reagent, and
separating the impurity metals from the feed solution by liquid-liquid extraction between the feed and extraction solutions which causes the impurity metals to separate from the feed solution into the extraction solution to thereby obtain a raffinate containing the product metals.

14. A method comprising:
providing an aqueous feed solution containing product metals cobalt and nickel and impurity metals zinc, iron, copper, calcium and/or manganese,
providing an extraction solution containing an extraction reagent,
pre-charging the extraction solution with cobalt and nickel, and
separating the impurity metals from the feed solution by liquid-liquid extraction between the feed and extraction solutions which causes the impurity metals to separate from the feed solution into the extraction solution to thereby obtain a raffinate containing the product metals, wherein
the pre-charging is carried out at a higher pH than the extraction.

* * * * *